United States Patent [19]

Sebel

[11] 4,008,116

[45] Feb. 15, 1977

[54] ADHESIVES BASED UPON POLYVINYL ALCOHOL AND STARCH

[75] Inventor: Hans-Georg Sebel, Dusseldorf-Holthausen, Germany

[73] Assignee: Henkel & Cie G.m.b.H., Dusseldorf-Holthausen, Germany

[22] Filed: Dec. 18, 1974

[21] Appl. No.: 533,981

[30] Foreign Application Priority Data

Dec. 24, 1973 Germany .......................... 2364438

[52] U.S. Cl. .............................. 156/328; 106/213; 106/214; 156/336; 260/17.4 ST; 428/533

[51] Int. Cl.² ......................................... C09T 3/02

[58] Field of Search .......... 156/334, 328, 297, 336, 156/210, 292; 428/532, 438, 533; 260/17.4 ST, 29.6 B; 106/210, 213, 211, 214, 212, DIG. 4, 80

[56] References Cited

UNITED STATES PATENTS

| | | | |
|---|---|---|---|
| 1,498,270 | 6/1924 | Harris | 106/80 |
| 2,250,681 | 7/1941 | Schwartz | 260/17.4 ST |
| 2,346,644 | 4/1944 | Bauer et al. | 106/213 |
| 2,487,448 | 11/1949 | Kingerley | 428/500 |
| 2,713,307 | 7/1955 | Adams | 106/214 |
| 2,764,568 | 9/1956 | Hawkins | 260/17.4 ST |
| 2,892,731 | 6/1959 | Claxton | 260/17.4 ST |
| 2,996,462 | 8/1961 | Robbins | 156/328 |
| 2,999,030 | 9/1961 | Rolderer et al. | 106/213 |
| 2,999,030 | 9/1961 | Rederer et al. | 106/213 |
| 3,133,890 | 5/1964 | Britton | 260/17.4 ST |
| 3,355,307 | 11/1967 | Schoenberger et al. | 106/213 |
| 3,498,869 | 3/1970 | Murakami et al. | 156/328 |
| 3,767,604 | 10/1973 | Hjermstad et al. | 260/17.4 ST |

FOREIGN PATENTS OR APPLICATIONS

| | | | |
|---|---|---|---|
| 555,456 | 1/1958 | Canada | 260/17.4 ST |

*Primary Examiner*—Edward G. Whitby
*Assistant Examiner*—J. J. Gallagher
*Attorney, Agent, or Firm*—Hammond & Littell

[57] ABSTRACT

The invention relates to an aqueous adhesive solution based on polyvinyl alcohol in combination with unboiled unoxidized alkali hydrolyzed neutralized starch for the mechanical labelling of bottles and glass vessels in high speed labelling machines. When dry the adhesive is resistant to condensation water. The solution has a polyvinyl alcohol content of 12% to 25%, based on the total weight of the solution and a thickener content of 0.1% to 1% by weight. The polyvinyl alcohol and starch are present in the weight ratio of 85% to 65% of polyvinyl alcohol, to 15% to 35% of unmodified, hydrolized starch.

12 Claims, No Drawings

ADHESIVES BASED UPON POLYVINYL ALCOHOL AND STARCH

THE PRIOR ART

Adhesives based on polyvinyl alcohol in aqueous solution are known. Polyvinyl alcohol in combination with starch or modified starch has also already been used for glueing purposes. However, most of the experiments with these combinations had failed because of the marked incompatibility of starch or starch products with polyvinyl alcohol in aqueous systems. Incompatibility is shown by phase separation or sedimentation phenomena after a few days and even after some hours.

Combinations of modified starch with polyvinyl alcohol have been recommended for the paper-making industry. Oxidized starches, phosphate starches, acetate starches and cationic starches were tested as starch components. When the starch derivatives were present in excess, and when the overall concentration of the aqueous preparation was as low as possible, a certain amount of compatibility has been achieved. However, such products have a storage stability of only a few days and were found to be inadequate to meet the high demands of ready-to-use industrial adhesives which are supplied in single packets or larger containers, when a storage stability of at least 6 months is required.

Adhesives for labelling drinking bottles by means of heavy-duty machines with speeds of up to 60,000 bottles/hour must meet particularly high requirements regarding the product properties, the processing parameters, the glueing properties and the economic factor. In the beer and mineral-water industries, the label glue is required to be resistant even to condensation water. Thus the adhesive beneath the label must not be washed away, nor may the labels slip as the result of formation of condensation water on cold bottles, the so-called "condensation water." Even though the desired properties are found in label adhesives based on casein, such glues have considerable disadvantages which exist because these glues are susceptible to decomposition by bacteria and to the development of strong decomposition odors associated therewith. During the summer months decomposition of casein glues can occur in the bottling plants directly after the labelling process.

OBJECTS OF THE INVENTION

An object of the present invention is to provide adhesives which do not have the above-described disadvantages of casein glues, and yet which meet the requirements demanded for labelling on very fast running machines, and which have resistance to condensation water.

Another object of the present invention is to provide aqueous adhesive solutions based on polyvinyl alcohol in combination with starch for the mechanical labelling of bottles and glass vessels, and which are resistant to condensation water.

These and further objects of the present invention will become apparent as the description thereof proceeds.

DESCRIPTION OF THE INVENTION

The present invention relates to adhesives based on polyvinyl alcohol in combination with starch for the mechanical labelling of bottles and glass vessels and which are resistant to condensation water.

More particularly, the present invention provides an aqueous adhesive solution comprising
 a. from 12% to 25% by weight of polyvinyl alcohol,
 b. an unmodified unboiled unoxidized alkali hydrolyzed neutralized starch, said polyvinyl alcohol and said starch being present in weight ratio of 65% to 85% of polyvinyl alcohol to 15% to 35% of said hydrolized starch,
 c. from 0.1% to 1.0% by weight of an inorganic thickening agent, and
 d. the balance up to 100% by weight of water.

Furthermore the present invention provides an improvement in a process for adhesively bonding together two substrates comprising applying an aqueous adhesive solution to at least one of said two substrates, placing said two substrates together with said aqueous adhesive solution therebetween as an intermediate layer, drying said intermediate layer, and recovering said adhesively bonded substrates. The improvement consists essentially in the use of the above-mentioned composition as said aqueous adhesive solution.

It has now been found that aqueous adhesive solutions based on polyvinyl alcohol which additionally contain said unmodified hydrolyzed starch and an inorganic thickening agent, fulfill the required conditions. Commercially available partially-saponified types of polyvinyl alcohol having a hydrolysis degree of about 80% to 88% may be used as the polyvinyl alcohol ingredient. Suitable polyvinyl alcohols are those having a viscosity in an aqueous 4% solution of from 18 to 55 cP, preferably from 20 to 50 cP measured according to DIN 53015 at 20° C. ("DIN" is the abreviation for Deutsche Industrie Norm which is a published series of standardized German test procedures, similar to ASTM). Within the given viscosity range for the polyvinyl alcohols, mixtures of types having a different viscosity can also be used. With regard to amount, the proportion of polyvinyl alcohol is approximately 12% to 25%, by weight, preferably about 15% to 20% by weight, based on the total weight of the adhesive solution.

Unboiled unoxidized alkali hydrolyzed starch is especially preferred for use as the unmodified hydrolyzed starch ingredient. In particular, potato starch is suitable for the process. Other kinds of starch may replace this potato starch, but only up to approximately 33.3% by weight. Native starch is hydrolyzed in an aqueous medium without heating by means of 7% to 18% by weight, preferably 10% to 16% by weight of alkali metal hydroxide, such as sodium hydroxide, based on the weight of the starch. The alkali metal hydroxide, as a 0.8% to 10% lye, affects the starch. The subsequent neutralization of the alkaline reaction mixture may be effected with a variety of acids, such as hydrochloric acid, phosphoric acid, acetic acid, but especially nitric acid. The reaction mixture should reach a pH value of 6.0 to 7.5, preferably 6.5. The resulting starch is not oxidized.

The thus obtained starch reaction mixture should be worked into the overall reaction mixture immediately. The quantity of starch used is adjusted to the quantity of polyvinyl alcohol present in the respective overall recipe. 15 to 35 parts by weight, preferably 20 to 30 parts by weight, of hydrolized native starch are used per 85 to 65 parts by weight, preferably 80 to 70 parts by weight, of polyvinyl alcohol.

Water-absorbent montmorillonite is preferred as the inorganic thickening agent. Other known silicon compounds, such as silicon dioxide produced by vapor phase hydrolysis, talc, bentonites, or kaolinite, may also be used jointly with the montmorillonite but only in the slightest amounts. The amount of thickening agent relative to the total amount of the adhesive is approximately between 0.1% and 1.0%, preferably between 0.2% and 0.5%. The substances mentioned herein as thickening agents possess properties which impart thixotropy. Other thioxotropic agents can also be used, provided that they can be worked into the adhesive and do not prove to be incompatible. Furthermore, preservatives and defoaming agents may also be present in the adhesives of the invention. A combination of various commercial preparations which have as little odor as possible, for example, benzoates, fluorides such as sodium fluoride, amide substances and hydroxybenzoic acid esters, such as methyl p-hydroxybenzoate or butyl p-hydroxybenzoate, are preferably used as preservatives, for example in amounts of from 0% to 1% preferably from 0.2% to 0.6% by weight. Commercial preparations, such as those, for example, based on stearates, silicon oil, polyethoxylated fatty acids and polyethoxylated fatty acid esters, may be used as defoaming agents. The addition products of ethylene oxide and propylene oxide to fatty alcohols having 12 to 18 carbon atoms are also suitable. Defoaming agents may be present in amounts of from 0% to 3.0% preferably from 0.3% to 2.5%, by weight based on the total amount of the adhesive.

Measured with the Brookfield viscosimeter RVF, spindle 7, at 20 rev./min. and at 20° C, the viscosity of the adhesives according to the invention ranges from 60,000 cP to 180,000 cP, preferably 70,000 cP to 90,000 cP. The pH value is between 5 and 7.

The adhesives of the invention have the advantages of being exceedingly stable during storage for more than six months. They have a remarkable stability with regard to viscosity both during storage and at fluctuating temperatures. They can be processed equally well, both at the relatively low temperatures of 10° C to 15° C and at the higher temperatures of 28° C to 30° C. They can be readily processed on labelling machines which operate at high speeds since they exhibit an excellent "short" running behavior. They are also useful for glueing paper and cardboard to each other and to other materials, such as wood, glass, plastic and metal. A preferred use is for adhesively bonding paper labels onto flasks and containers.

With regard to their consistency and properties, the operative production batches prove to be very uniform. The resistance inherent in the adhesives to condensation water can be adjusted in a graduated manner by varying the composition. The susceptibility to decomposition of the adhesives according to the invention is already significantly less because of their chemical composition than that of the casein glues. If however, there should be any microbe contamination, the products do not release any foul decomposition odors, as occurs with products containing albumen.

The following examples are merely illustrative of the present invention without being deemed limitative in any manner thereof.

EXAMPLES

Adhesive mixtures were produced as follows:
The starch was suspended in 20% to 30% of water, relative to the total amount of the adhesive, in a high-speed stirring device having a high degree of mechanical efficiency. After the addition of sodium hydroxide as 25% to 50% sodium lye, the mixture was made into a paste by stirring intensely for 10 to 15 minutes until the mixture had assumed a viscous consistency. The further steps of the process were also carried out with intense stirring. After the pasting process, the mixture was neutralized with approximately 25% nitric acid, adjusted to a pH value of 6 to 7 and immediately processed further. The gelling agent was added as a 5% stock paste, then the defoaming agent was added. The remaining proportion of water was further added, and also the polyvinyl alcohol. The reaction mixture was then heated to 90° C to 95° C and stirred further for 30 to 60 minutes in this temperature range until the polyvinyl alcohol was completely dissolved. Finally, the preservative was added. The adhesive was decanted without prior cooling. During a ripening period of several days, the viscosity of the adhesives thus produced increased by 10,000 cP to 30,000 cP, depending upon the amount of the initial viscosity, up to a permanent end value. This amounted to 80,000 cP or 75,000 cP respectively, measured in the Brookfield viscosimeter (RVF model, spindle 7, 20 rev./min. at 20° C.).

In the following table, the composition of two adhesives according to the invention is given, wherein the first column contains the substances used and the following columns contain the amounts.

TABLE

| | Example 1 | Example 2 |
|---|---|---|
| | % | % |
| Potato starch | 4.65 | 5.75 |
| Water | 24.76 | 23.90 |
| Sodium lye, 25% | 2.85 | 2.75 |
| Nitric acid, 25% | 4.24 | 4.10 |
| Mg-montmorillonite | 0.20 | 0.20 |
| Adduct of 2 mols of ethylene oxide and 4 mols of propylene oxide to 1 mol of fatty alcohol ($C_{12}$–$C_{18}$) | 0.30 | 0.20 |
| Silicon oil (commercial defoamer | 1.00 | 0.80 |
| Water | 43.20 | 47.52 |
| Polyvinyl alcohol 1) | 18.50 | — |
| Polyvinyl alcohol 2) | — | 14.38 |
| Sodium fluoride | 0.20 | 0.20 |
| Methyl hydroxybenzoate | 0.10 | 0.20 |

For Example 1, the degree of hydrolysis was 88%; the viscosity in an aqueous 4% solution was 26 cP.

For Example 2, the degree of hydrolysis was 88%; the viscosity in an aqueous 4% solution was 40 cP.

EXAMPLE 3

Heavy duty machines with speeds of up to 60,000 bottles per hour were utilized for adhesive bonding labels onto drinking bottles. In the first series of tests the adhesive according to Example 1 above was used. In the second series of tests the adhesive according to Example 2 above was utilized.

The adhesive of the invention has a storage stability of more than 6 months. Because of its "short" structure, the product of the invention did not produce any drawing of threads and had a particularly clean machine-running behavior. The consistency and viscosity were also unimpaired by relatively big differences in temperature. The adhesive was still flowable and processable at the low temperature of 10° C. Moreover, no processing problems occured even during hot summer weather.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

I claim:
1. An aqueous adhesive solution consisting essentially of:
   a. 12% to 25% by weight of a polyvinyl alcohol which is water-soluble in the range 10° C.–30° C.,
   b. an unmodified unboiled unoxidized alkali hydrolyzed neutralized starch, the weight ratio of said polyvinyl alcohol to said starch being 65% – 85% : 15% – 35%,
   c. 0.1% to 1.0% by weight of an inorganic thickening agent, and
   d. water.
2. The solution of claim 1, wherein the weight of polyvinyl alcohol is 15% to 20% of the weight of said solution.
3. The solution of claim 1, wherein said weight ratio is from 70% to 80% of polyvinyl alcohol to 20% to 30% of said starch.
4. The solution of claim 1, wherein said polyvinyl alcohol has a degree of hydrolysis of 80% to 88%.
5. The solution of claim 1, wherein the weight of said thickening agent is 0.2% to 0.5% of the weight of said composition.
6. The solution of claim 1 wherein said thickening agent is an alkaline earth montmorillonite.
7. A solution according to claim 1 wherein the polyvinyl alcohol has a viscosity of 18 cP to 55 cP as a 4% solution in water at 20° C.
8. A solution according to claim 1 having a viscosity at 20° C. between 60,000 and 90,000, and a pH between 5 and 7.
9. In a process for adhesively bonding together two substrates wherein an aqueous adhesive solution is applied to at least one of said substrates, said substrates are placed together with said solution therebetween as an intermediate adhesive layer, and said intermediate layer is dried: the improvement wherein the solution of claim 1 is said adhesive layer.
10. The process of claim 9, wherein each of said substrates is selected from the group consisting of paper, cardboard, wood, glass, plastic and metal.
11. The process of claim 9, wherein one of said substrates is in the form of a container, the other substrate is paper, and said paper is applied to the outer surface of said container.
12. In an aqueous polyvinyl alcohol-starch adhesive solution consisting essentially of (A) a water-soluble polyvinyl alcohol having a viscosity of 18 to 55 cP as a 4% solution in water at room temperature and (B) unmodified unboiled unoxidized alkali hydrolyzed neutralized starch, the weight ratio of said polyvinyl alcohol to said starch being 65–85%:15–35%, the weight of said polyvinyl alcohol being 12% to 25% of the weight of said solution: a small but effective amount in the range of 0.1% to 1% based on the weight of said solution of (C) and inorganic thickening agent; said composition having improved water-resistance when dry.

* * * * *